US012162291B2

(12) United States Patent
Kubota

(10) Patent No.: US 12,162,291 B2
(45) Date of Patent: Dec. 10, 2024

(54) PRINTING APPARATUS

(71) Applicant: TOPPAN INC., Tokyo (JP)

(72) Inventor: Masashi Kubota, Tokyo (JP)

(73) Assignee: TOPPAN INC., Tokyo (JP)

( * ) Notice: Subject to any disclaimer, the term of this patent is extended or adjusted under 35 U.S.C. 154(b) by 140 days.

(21) Appl. No.: 17/739,685

(22) Filed: May 9, 2022

(65) Prior Publication Data

US 2022/0258491 A1 Aug. 18, 2022

Related U.S. Application Data

(63) Continuation of application No. PCT/JP2019/044573, filed on Nov. 13, 2019.

(51) Int. Cl.
*B41J 2/325* (2006.01)

(52) U.S. Cl.
CPC .................................... *B41J 2/325* (2013.01)

(58) Field of Classification Search
CPC .................................. B41J 2/325; B41J 17/30
USPC .......................................................... 347/217
See application file for complete search history.

(56) References Cited

U.S. PATENT DOCUMENTS 5,072,238 A * 12/1991 Takamiya ................ B41J 2/325 347/198
2002/0178939 A1* 12/2002 Tsuruta ................ B41J 13/0045 101/33
2003/0174195 A1* 9/2003 Onishi ....................... B41J 3/38 347/105

FOREIGN PATENT DOCUMENTS

JP 2012-066488 A 4/2012
JP 2013-022797 A 2/2013
JP 2013-21676 A 6/2013
JP 2013-121676 A 6/2013

OTHER PUBLICATIONS

International Searching Authority, "International Search Report," issued in connection with International Patent Application No. PCT/JP2019/044573, dated Jan. 7, 2020, 5 pages.

(Continued)

*Primary Examiner* — Jason S Uhlenhake
*Assistant Examiner* — Alexander D Shenderov
(74) *Attorney, Agent, or Firm* — Foley & Lardner LLP

(57) ABSTRACT

A printing apparatus includes a head mechanism including a thermal head; a ribbon conveyance unit that defines a conveyance path of a thermal transfer ribbon and conveys the thermal transfer ribbon along the conveyance path of the thermal transfer ribbon; and a medium conveyance unit that defines a conveyance path of a transfer target medium and conveys the transfer target medium along the conveyance path of the transfer target medium. Each of the conveyance path of the thermal transfer ribbon and the conveyance path of the transfer target medium includes a transfer position and a peeling position downstream of the transfer position, the transfer position being a position where the thermal transfer ribbon overlaid on the transfer target medium is subjected to heat and pressure from the thermal head, the peeling position being a position where the thermal transfer ribbon starts to be peeled away from the transfer target medium.

19 Claims, 3 Drawing Sheets

(56) References Cited

OTHER PUBLICATIONS

International Searching Authority, "Written Opinion," issued in connection with International Patent Application No. PCT/JP2019/044573, dated Jan. 7, 2020, 4 pages.

Wikipedia, "Thermosetting polymer", Feb. 27, 2024, Retrieved from: https://en.wikipedia.org/w/index.php?title=Thermosetting_polymer&oldid=1210529135.

* cited by examiner

PRINTING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/044573, filed on Nov. 13, 2019, the disclosure of which is incorporated herein by reference in its entirety.

TECHNICAL FIELD

The present invention relates to a printing apparatus that uses a thermal transfer ribbon.

BACKGROUND

A thermal transfer printing apparatus forms characters and images on a transfer target medium using a thermal transfer ribbon. The thermal transfer ribbon includes a substrate and a transfer layer supported on the substrate. The printing apparatus brings the transfer layer of the thermal transfer ribbon into contact with the transfer target medium, and presses the selected region of the thermal transfer ribbon against the transfer target medium while applying heat to that region. Thus, the transfer layer in the selected region, which is referred to as the transfer target region, is transferred to the transfer target medium. The transfer target region is defined to represent characters and images so that the characters and images of the transfer layer are formed on the transfer target medium.

In an example of the thermal transfer ribbon, the transfer layer includes an optical functional layer. The optical functional layer has a diffraction structure constituting a hologram. Interference and diffraction of light by the diffraction structure act to change colors of the optical functional layer according to the observation angle, thereby enhancing the effect of anti-counterfeiting and decorativeness of a print product with the optical functional layer transferred thereto (see, for example, PTL 1).

[Citation List] [Patent Literature] PTL 1: JP 2012-66488 A

SUMMARY OF THE INVENTION

Technical Problem

In the thermal transfer ribbon, the transfer layer includes a release layer in contact with the substrate and an adhesive layer to be brought into contact with the transfer target medium. If the transfer layer includes the optical functional layer, the optical functional layer is disposed between the release layer and the adhesive layer. In the transfer target region of the thermal transfer ribbon subjected to heat and pressure from the printing apparatus, the adhesion between the substrate and the release layer decreases, whereas the adhesion between the adhesive layer and the transfer target medium increases. As a result, the transfer layer separates from the substrate and is fixed to the transfer target medium.

The heat applied to the thermal transfer ribbon is likely to be transferred to the region surrounding the transfer target region, so that the adhesion between the substrate and the release layer decreases in the surrounding region as well. On the other hand, the pressure applied to the thermal transfer ribbon is less easily transferred to the surrounding region, so that the adhesion between the adhesive layer and the transfer target medium is less likely to be increased. That is, the transfer layer in the surrounding region easily separates from the substrate and is unlikely to be fixed to the transfer target medium. When the transfer layer in the surrounding region separates from the substrate, a marginal part is formed on the transfer target medium around a transferred part composed of the transfer layer in the transfer target region, in such a manner as to extend from the transferred part. The marginal part is a portion of the transfer layer in the surrounding region having separated from the substrate and thus is likely to become detached from the transfer target medium. If the marginal part is formed, it may become detached from the transfer target medium and hinder smooth progress of processing after transfer using the thermal transfer ribbon.

In particular, the optical functional layer having a diffraction structure of microscopic asperities is harder than a color layer formed by application of ink. Thus, if the transfer layer includes the optical functional layer, the transfer layer in the surrounding region is likely to separate from the substrate together with the transfer layer in the transfer target region; that is, the marginal part is likely to be formed.

An object of the present invention is to provide a printing apparatus with which formation of marginal parts is better suppressed.

Solution to Problem

A printing apparatus to solve the above problem is a printing apparatus that is configured to transfer a transfer layer including a hologram from a thermal transfer ribbon having the transfer layer to a transfer target medium and that includes a head mechanism including a thermal head; a ribbon conveyance unit that defines a conveyance path of the thermal transfer ribbon and conveys the thermal transfer ribbon along the conveyance path of the thermal transfer ribbon; and a medium conveyance unit that defines a conveyance path of the transfer target medium and conveys the transfer target medium along the conveyance path of the transfer target medium, where each of the conveyance path of the thermal transfer ribbon and the conveyance path of the transfer target medium includes a transfer position and a peeling position downstream of the transfer position, the transfer position being a position where the thermal transfer ribbon overlaid on the transfer target medium is subjected to heat and pressure from the thermal head, the peeling position being a position where the thermal transfer ribbon starts to be peeled away from the transfer target medium, and an angle formed by a direction in which the thermal transfer ribbon is conveyed from the peeling position and a direction in which the transfer target medium is conveyed from the peeling position is 30° or less.

A printing apparatus to solve the above problem is a printing apparatus that is configured to transfer a transfer layer from a thermal transfer ribbon having a substrate and the transfer layer to a transfer target medium, the transfer layer including a release layer in contact with the substrate and a resin layer containing a hardening resin and in contact with the release layer, the printing apparatus including a head mechanism including a thermal head; a ribbon conveyance unit that defines a conveyance path of the thermal transfer ribbon and conveys the thermal transfer ribbon along the conveyance path of the thermal transfer ribbon; and a medium conveyance unit that defines a conveyance path of the transfer target medium and conveys the transfer target medium along the conveyance path of the transfer target medium, where each of the conveyance path of the thermal transfer ribbon and the conveyance path of the transfer target medium includes a transfer position and a peeling position downstream of the transfer position, the transfer position being a position where the thermal transfer ribbon overlaid on the transfer target medium is subjected to heat and pressure from the thermal head, the peeling position being a position where the thermal transfer ribbon starts to be peeled away from the transfer target medium, and an angle formed by a direction in which the thermal transfer ribbon is conveyed from the peeling position and a direction in which the transfer target medium is conveyed from the peeling position is 30° or less.

According to the above configurations, compared with the case where the above angle is large, the adhesive force corresponding to the force necessary for separation between the substrate and the transfer layer in the thermal transfer ribbon is large. Additionally, in the thermal transfer ribbon, the adhesive force is larger in the region subjected only to heat from the thermal head than in the region subjected to heat and pressure from the thermal head. Therefore, even if heat is transferred from the transfer target region under heat and pressure to the surrounding region, the transfer layer in the surrounding region is better suppressed from being peeled away from the substrate. This suppresses formation of the marginal parts.

In the above configurations, the angle formed by the direction in which the thermal transfer ribbon is conveyed from the peeling position and the direction in which the transfer target medium is conveyed from the peeling position may be 15° or less.

This configuration further increases both the above adhesive force and a difference in the adhesive force between the region subjected to heat and pressure and the region subjected only to heat. Therefore, the above configuration can more appropriately suppress formation of the marginal parts.

In the above configuration, the ribbon conveyance unit may include a path definition member configured to contact the thermal transfer ribbon at a position downstream of the transfer position to define the direction in which the thermal transfer ribbon is conveyed, and the path definition member may be connected to a part of the head mechanism other than the thermal head.

In the above configuration, the head mechanism may include a movable part that changes the position of the thermal head with respect to the conveyance path of the thermal transfer ribbon, the movable part may be connected to the thermal head on the side opposite to that facing the conveyance path of the thermal transfer ribbon, and the path definition member may be connected to a part of the head mechanism on the side of the movable part opposite to that facing the thermal head.

According to the above configurations, compared with the case where the path definition member is connected to the thermal head, it is possible to suppress the path definition member from reaching a high temperature, which, in turn, suppresses conduction of heat from the path definition member to the thermal transfer ribbon, which would otherwise reach a high temperature at the peeling position. Thus, the above configurations can suppress reduction of the adhesive force in the thermal transfer ribbon. This can more appropriately suppress formation of the marginal part.

Advantageous Effects of Invention

According to the present invention, formation of the marginal parts is better suppressed during transfer using a thermal transfer ribbon.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

An embodiment of a printing apparatus will be described with reference to FIGS. 1 to 8.

[Configuration of Thermal Transfer Ribbon]

The configuration of a thermal transfer ribbon used in the printing apparatus of the present embodiment will be described.

Figure 1:
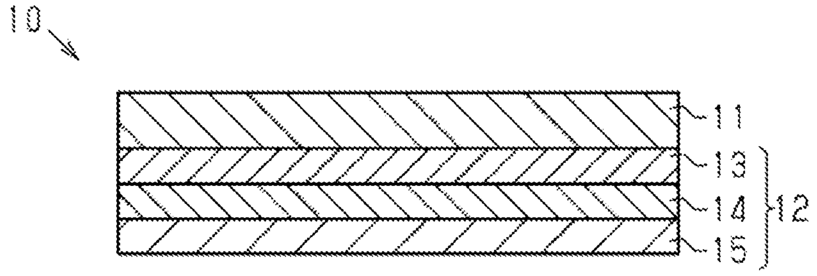
FIG. 1 is a diagram illustrating a layer structure of a thermal transfer ribbon used in an embodiment of a printing apparatus.

As illustrated in FIG. 1, a thermal transfer ribbon 10, which is a sheet extending in a strip shape, includes a substrate 11 and a transfer layer 12. The transfer layer 12 includes a release layer 13, an optical functional layer 14, and an adhesive layer 15. The release layer 13 is in contact with the substrate 11. The adhesive layer 15 is positioned as the outermost part of the thermal transfer ribbon 10 on the side opposite to that on which the substrate 11 is located. The optical functional layer 14 is disposed between the release layer 13 and the adhesive layer 15.

In order to transfer the transfer layer 12 to the transfer target medium, the thermal transfer ribbon 10 and the transfer target medium are overlaid on each other such that the adhesive layer 15 and the transfer target medium are in contact with each other, and the thermal transfer ribbon 10 is subjected to heat and pressure from the side of the transfer layer 12 on which the substrate 11 is positioned. The region of the thermal transfer ribbon 10 subjected to heat and pressure is referred to as a transfer target region.

The substrate 11 is a resin substrate. The substrate 11 is preferably formed of a highly heat-resistant material such as polyethylene terephthalate (PET), cellophane, which is a thin film made from cellulose, or polypropylene. In particular, the substrate 11 is preferably formed of PET. The substrate 11 may have a thickness of, for example, 4 μm or more and 50 μm or less.

The release layer 13 includes an acrylic resin, an epoxy resin, a butyral resin, an epoxy acrylate resin, a urethane acrylate resin, or the like. In particular, the main component of the release layer 13 is preferably an acrylic material. The release layer 13 may have a thickness of, for example, 0.1 μm or more and 5 μm or less.

The optical functional layer 14 includes a diffraction structure layer having a diffraction structure constituting a hologram. The diffraction structure is a microscopic-asperity structure such as a relief structure. The diffraction structure layer is an example of a resin layer that contains a hardening resin such as a photosetting resin or a thermosetting resin as the main component. The optical functional layer 14 may include, in addition to the diffraction structure layer, a reflective layer for increasing the intensity of light emerging from the diffraction structure layer. The reflective layer may be formed of, for example, a transparent dielectric. The optical functional layer 14 may have a thickness of, for example, 0.1 μm or more and 5 μm or less.

The adhesive layer 15 contains an acrylic resin, an epoxy resin, a urethane resin, a polyester resin, or the like, as the main component. The adhesive layer may have a thickness of, for example, 0.1 μm or more and 10 μm or less.

In addition to the release layer 13, optical functional layer 14, and adhesive layer 15, the transfer layer 12 may include another layer such as a layer for enhancing the adhesion between the release layer 13 and the optical functional layer 14. The transfer layer 12 may have a total thickness of, for example, 0.3 μm or more and 50 μm or less. Note that the main component of each layer refers to a component having the highest percentage of content in the layer.

In order to suppress the formation of the marginal part, the adhesion between the substrate 11 and the release layer 13 is enhanced to increase the adhesive force F corresponding to the force required for separation between the substrate 11 and the transfer layer 12 so that the adhesive force F can have a sufficient magnitude even if the adhesive force F is lowered by heating of the thermal transfer ribbon 10. If the adhesive force F has a sufficient magnitude, when the thermal transfer ribbon 10 is peeled away from the transfer target medium, the transfer layer 12 separates from the substrate 11 and is left on the transfer target medium only in the transfer target region, which has been subjected to heat and pressure to have high adhesion between the adhesive layer 15 and the transfer target medium.

The adhesive force F may be increased by adjusting the material of the thermal transfer ribbon 10.

For example, if the substrate 11 is made of PET, a high-adhesion material that is a material with high adhesion to PET may be mixed into the material of the release layer 13 to enhance the adhesion of the release layer 13 to the substrate 11. The high-adhesion material is a resin that has a high affinity for PET and may be, for example, polyester. However, the release layer 13 contains an acrylic material as the main component to ensure hardness and chemical resistance thereof. A material with a high affinity for PET, such as polyester, is likely to cause phase separation from an acrylic material and thus is not suitable for addition to the release layer 13.

Additionally, the diffraction structure layer of the optical functional layer 14 contains a hardening agent compatible with the hardening resin thereof (the main component), that is, a thermosetting agent such as isocyanate or a UV curing agent. Such an agent is added to the optical functional layer 14 to suppress deformation of microscopic asperities thereof due to heating during transfer, in other words, to enhance heat resistance of the diffraction structure. Therefore, the transfer layer 12 including the optical functional layer 14 is harder than a transfer layer including a color layer formed by ink coating, that is, a transfer layer in a thermal transfer ribbon used to form a region representing color from one or more colorants.

Since a hardening agent has dispersibility, if the optical functional layer 14 contains a hardening agent, the hardening agent will be dispersed to the release layer 13. Thus, if the release layer 13 contains a high-adhesion material, such a material may react with the hardening agent, possibly resulting in the adhesion between the substrate 11 and the release layer 13 being excessively high. If the adhesion between the substrate 11 and the release layer 13 is excessively high, the transfer layer 12 becomes hard to separate from the substrate 11 even in the transfer target region, thereby degrading the accuracy of transfer.

Since it is difficult to control the degree of dispersion of the hardening agent, it is difficult to control the adhesion between the substrate 11 and the release layer 13 by adjusting the amount of high-adhesion material added to the release layer 13. The adhesion between the substrate 11 and the release layer 13 may be controlled by forming a film of melamine on the surface of the substrate 11. This approach, however, requires dedicated equipment for forming a film of melamine, which increases the cost of manufacturing the thermal transfer ribbon 10.

As above, it is difficult to increase the adhesive force F of the thermal transfer ribbon 10 including the optical functional layer 14 by adjusting the material. Even if the adhesive force F can be increased by adjusting the material(s), usable materials and the content thereof are strictly limited and this increases the load of manufacturing the thermal transfer ribbon 10. Thus, focusing on the angle at which to peel the thermal transfer ribbon 10 away from the transfer target medium and the temperature of the thermal transfer ribbon 10 at the time of peeling, the inventor of the present application analyzed the relationship between these conditions and the adhesive force F. Consequently, the inventor has discovered that the formation of the marginal parts can be more suppressed by improving the configuration of the printing apparatus.

[Definition of Peeling Angle]

Prior to description of the printing apparatus of the present embodiment, a peeling angle α will be described. The thermal transfer printing apparatus brings a transfer medium into contact with a transfer target medium, applies heat and pressure to a transfer target region of the transfer medium, and then peels the transfer medium away from the transfer target medium. The transfer medium is a thermal transfer ribbon, and the transfer target medium is a film or paper.

The angle formed between the transfer medium and the transfer target medium at the start point of peeling of the transfer medium from the transfer target medium is the peeling angle α. The peeling angle α will be hereinafter described in detail with reference to the drawings.

Figure 2:
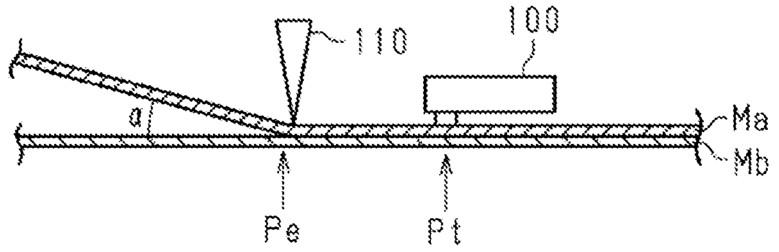
FIG. 2 is a diagram illustrating an example of a peeling angle.

As illustrated in FIG. 2, in the printing apparatus, a thermal head 100 applies heat and pressure. A transfer medium Ma and a transfer target medium Mb are conveyed through a transfer position Pt and a peeling position Pe.

At the transfer position Pt, the transfer medium Ma is overlaid on the transfer target medium Mb and is subjected to heat and pressure from the thermal head 100.

The transfer medium Ma is peeled away from the transfer target medium Mb at a position downstream of the transfer position Pt in the conveyance path. The position at which the transfer medium Ma starts to separate from the transfer target medium Mb is the peeling position Pe. That is, the direction in which the transfer medium Ma is conveyed from the peeling position Pe and the direction in which the transfer target medium Mb is conveyed from the peeling position Pe are different from each other. The angle formed by a first direction that is the direction in which the transfer medium Ma is conveyed from the peeling position Pe and a second direction that is the direction in which the transfer target medium Mb is conveyed from the peeling position Pe is the peeling angle α. In other words, the peeling angle α is the angle formed between the conveyance path of the transfer medium Ma and the conveyance path of the transfer target medium Mb at the peeling position Pe.

The conveyance path of the transfer medium Ma is defined by the conveyance mechanism for the transfer medium Ma, and the conveyance path of the transfer target medium Mb is defined by the conveyance mechanism for the transfer target medium Mb. The conveyance mechanisms for the media each include a mechanism such as a roller for delivering and collecting the medium and a mechanism for supporting the medium in the conveyance path.

For example, the direction in which the transfer medium Ma is conveyed is defined by the path definition member 110 included in the conveyance mechanism for the transfer medium Ma, whereby the peeling position Pe and the peeling angle α are determined. The path definition member 110 contacts the transfer medium Ma at a position downstream of the transfer position Pt to change the direction in which the transfer medium Ma is conveyed.

In the example illustrated in FIG. 2, the path definition member 110 is disposed downstream of the transfer position Pt, at a position contacting the transfer medium Ma overlaid on the transfer target medium Mb. The peeling position Pe is formed immediately after the position where the path definition member 110 contacts the transfer medium Ma. That is, the peeling position Pe is determined by the position of the path definition member 110 in a direction along the flow of the medium. The direction in which the transfer target medium Mb is conveyed does not change between upstream and downstream of the peeling position Pe. If the passage point of the transfer medium Ma is defined at a predetermined position downstream of the peeling position Pe by, for example, the position of a member supporting the transfer medium Ma and/or the position of a roller for taking up the transfer medium Ma, the peeling angle α varies depending on the peeling position Pe. Therefore, the peeling angle α is determined by the position of the path definition member 110 in the direction along the flow of the medium.

Figure 3:
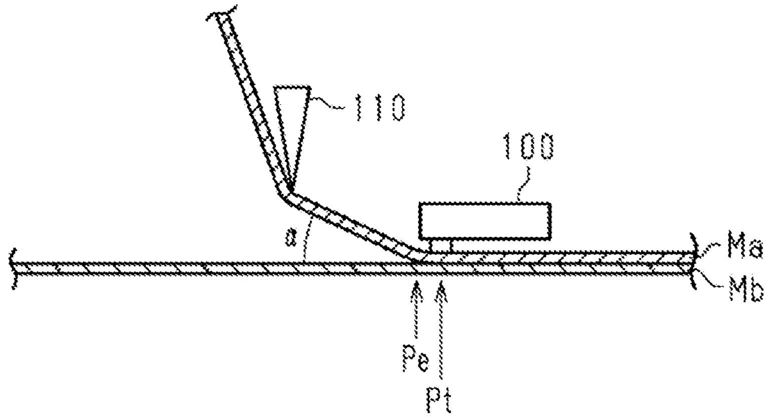
FIG. 3 is a diagram illustrating another example of a peeling angle.

In the example illustrated in FIG. 3, the path definition member 110 is disposed downstream of both the transfer position Pt and the peeling position Pe, at a position contacting the transfer medium Ma having been peeled away from the transfer target medium Mb. The peeling position Pe is formed near the transfer position Pt, and the transfer medium Ma is conveyed in the direction from the peeling position Pe toward the position of contact with the path definition member 110. The direction in which the transfer target medium Mb is conveyed does not change between upstream and downstream of the peeling position Pe. In this case, the peeling angle α is determined by the position of the path definition member 110 with respect to the peeling position Pe. In other words, the peeling angle α is determined by the position of the path definition member 110 in the direction along the flow of the medium and a height direction orthogonal to the direction along the flow of the medium.

Besides the above examples, the path definition member 110 may have, for example, an oblique surface with a predetermined angle, and the oblique surface may contact the transfer medium Ma at a position downstream of the peeling position Pe. In this case, the transfer medium Ma is conveyed from the peeling position Pe along the oblique surface. That is, the path definition member 110 defines the direction in which the transfer medium Ma is conveyed from the peeling position Pe, whereby the peeling angle α is determined.

In any case, the path definition member 110 has a function of changing the direction in which the transfer medium Ma is conveyed between upstream and downstream of the position where the path definition member 110 contacts the transfer medium Ma. At least one of the peeling position Pe and the peeling angle α is determined upon the path definition member 110 changing the direction in which the transfer medium Ma is conveyed.

The printing apparatus may not be provided with the path definition member 110, and the peeling position Pe and the peeling angle α may be defined by the position of, for example, the roller for taking up the transfer medium Ma. Additionally, the direction in which the transfer target medium Mb is conveyed may be changed in the conveyance path, and this may contribute to the definition of the peeling position Pe and peeling angle α.

[Configuration of Printing Apparatus]

The configuration of the printing apparatus according to the present embodiment will be described. The printing apparatus of the present embodiment is configured such that the peeling angle α is 30° or less.

Figure 4:
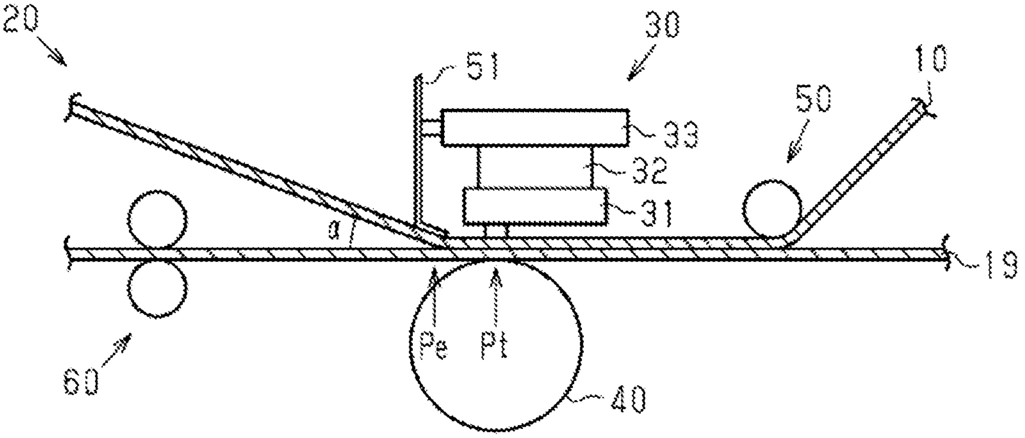
FIG. 4 is a diagram illustrating the configuration of the embodiment of the printing apparatus.

As illustrated in FIG. 4, a printing apparatus 20 of the present embodiment includes a head mechanism 30 including a thermal head 31, a platen roller 40 facing the thermal head 31, a ribbon conveyance unit 50 that is the conveyance mechanism for the thermal transfer ribbon 10, and a medium conveyance unit 60 that is the conveyance mechanism for a transfer target medium 19.

The ribbon conveyance unit 50 defines the conveyance path of the thermal transfer ribbon 10 and conveys the thermal transfer ribbon 10 along the conveyance path. The medium conveyance unit 60 defines the conveyance path of the transfer target medium 19 and conveys the transfer target medium 19 along the conveyance path. The conveyance path of the thermal transfer ribbon 10 is an example of a first conveyance path, and the conveyance path of the transfer target medium 19 is an example of a second conveyance path. The platen roller 40 supports the transfer target medium 19 and rotates on its axis parallel to a width direction of the conveyance path of the transfer target medium 19.

Each of the conveyance path of the thermal transfer ribbon 10 and the conveyance path of the transfer target medium 19 includes the transfer position Pt and the peeling position Pe.

The transfer position Pt is a position where the thermal transfer ribbon 10 overlaid on the transfer target medium 19 is subjected to heat and pressure from the thermal head 31. At the transfer position Pt, the thermal transfer ribbon 10 contacts the transfer target medium 19 such that the transfer target medium 19 and the transfer layer 12 contact each other, and the thermal transfer ribbon 10 and the transfer target medium 19 are sandwiched between the thermal head 31 and the platen roller 40. Heat and pressure are applied to the thermal transfer ribbon 10 from the side of the transfer layer 12 on which the substrate 11 is positioned.

The peeling position Pe is a position that is downstream of the transfer position Pt and where the thermal transfer ribbon 10 starts to be peeled away from the transfer target medium 19. As the thermal transfer ribbon 10 is peeled away from the transfer target medium 19, a part of the transfer layer 12, that is, a part of the transfer layer 12 to be transferred, separates from the substrate 11 and is left on the transfer target medium 19.

The thermal head 31 includes a plurality of resistive heating elements. The plurality of resistive heating elements are capable of selectively generating heat by energization and are aligned in the width direction of the conveyance paths of the thermal transfer ribbon 10 and transfer target medium 19. The thermal transfer ribbon 10 faces the resistive heating elements at the transfer position Pt. At the transfer position Pt, the resistive heating elements generating heat press the thermal transfer ribbon 10 against the transfer target medium 19. A part of the thermal transfer ribbon 10 pressed by the resistive heating element generating heat is a transfer target region. When pressed by the resistive heating element, a part of the transfer layer 12 in the transfer target region is transferred to the transfer target medium 19, so that dots including a hologram are formed on the transfer target medium 19. The diameter of the region pressed by a single resistive heating element, that is, the dot diameter, may be, for example, 10 μm or more and 500 μm or less.

The thermal head 31 includes a control unit that controls energization of the resistive heating elements. The control unit causes the resistive heating elements at the positions corresponding to the data of a printing target to generate heat. The thermal transfer ribbon 10 and the transfer target medium 19 are moved by cooperation among the platen roller 40, ribbon conveyance unit 50, and medium conveyance unit 60, so that dot rows are formed in sequence on the transfer target medium 19. Thus, the characters and/or images as a printing target composed of an aggregate of dots are formed on the transfer target medium 19.

In the printing apparatus 20 of the present embodiment, the ribbon conveyance unit 50 and the medium conveyance unit 60 are configured such that the peeling angle α is 30° or less. That is, the ribbon conveyance unit 50 defines the conveyance path of the thermal transfer ribbon 10, and the medium conveyance unit 60 defines the conveyance path of the transfer target medium 19, such that the peeling angle α is 30° or less.

The thermal transfer ribbon 10 is wound in a roll form before use. The ribbon conveyance unit 50 includes a delivery roller that delivers the thermal transfer ribbon 10 from the roll toward the transfer position Pt, a take-up roller that takes up the thermal transfer ribbon 10 after use at a position downstream of the peeling position Pe, and a plurality of support rollers that support the thermal transfer ribbon 10 between the delivery roller and the take-up roller.

The transfer target medium 19 may be paper or film cut into a predetermined length or may be a strip-like film supplied from a roll. The medium conveyance unit 60 includes a delivery mechanism that delivers the transfer target medium 19 toward the transfer position Pt, a collection mechanism that collects the transfer target medium 19 at a position downstream of the peeling position Pe, and a roller and/or a support for supporting the transfer target medium 19 between the delivery mechanism and the collection mechanism.

The ribbon conveyance unit 50 further includes a path definition member 51. The path definition member 51 contacts the thermal transfer ribbon 10 at a position downstream of the transfer position Pt, from the side of the thermal transfer ribbon 10 on which the substrate 11 is positioned. When the path definition member 51 contacts the thermal transfer ribbon 10, the direction in which the thermal transfer ribbon 10 is conveyed changes between upstream and downstream of the position where the path definition member 51 contacts the thermal transfer ribbon 10. The path definition member 51 is connected to the head mechanism 30.

In the example illustrated in FIG. 4, the path definition member 51 has an oblique surface that contacts the thermal transfer ribbon 10. The peeling position Pe is formed near an upstream end of a portion where the path definition member 51 and the thermal transfer ribbon 10 are in contact with each other. The thermal transfer ribbon 10 is conveyed from the peeling position Pe along the oblique surface of the path definition member 51. As above, the peeling position Pe is defined by the position of the path definition member 51, and the peeling angle α is defined by the angle of the oblique surface.

The configuration of the path definition member 51 for defining the peeling position Pe and the peeling angle α may be different from that illustrated in FIG. 4. In the printing apparatus 20, any of the configurations of the path definition member 110 for defining the peeling position Pe and the peeling angle α described above may be used. In short, as one of factors in defining the peeling angle α, the path definition member 51 defines the direction in which the thermal transfer ribbon 10 is conveyed.

If the peeling angle α is 30° or less, the adhesive force F is increased, thereby suppressing the marginal parts from being formed. In order to further suppress the formation of the marginal parts, the peeling angle α is more preferably 15° or less. In order to facilitate production of the printing apparatus 20, the peeling angle α is more preferably 2° or more.

A description will be given of the position on the head mechanism 30 to which the path definition member 51 is connected. The head mechanism 30 includes, in addition to the thermal head 31, a movable part 32 that changes the position of the thermal head 31 with respect to the conveyance path of the thermal transfer ribbon 10. In other words, the movable part 32 moves to change the distance between the thermal transfer ribbon 10 and the thermal head 31. The movable part 32 is connected to the thermal head 31 on the side opposite to that facing the conveyance path of the thermal transfer ribbon 10. At the start of transfer from the thermal transfer ribbon 10 to the transfer target medium 19, the movable part 32 brings the thermal head 31 close to the thermal transfer ribbon 10.

The path definition member 51 is connected to a part of the head mechanism 30 other than the thermal head 31. Specifically, the path definition member 51 is supported by a support part 33 of the head mechanism 30. The support part 33 is positioned on the side of the movable part 32 opposite to that facing the thermal head 31. The support part 33 may be, for example, a part that functions as a frame supporting the movable part 32 and the thermal head 31.

Since the path definition member 51 contacts the thermal transfer ribbon 10 near the peeling position Pe, if the path definition member 51 is at a high temperature, the heat of the path definition member 51 is transferred to the thermal transfer ribbon 10, so that the temperature of the thermal transfer ribbon 10 rises at the peeling position Pe. However, since the adhesive force F of the thermal transfer ribbon 10 becomes larger as the temperature of the thermal transfer ribbon 10 is lower, the temperature of the thermal transfer ribbon 10 is preferably low at the peeling position Pe.

In the present embodiment, the path definition member 51 is connected to a part of the head mechanism 30 other than the thermal head 31, so that the path definition member 51 is unlikely to reach a high temperature compared with the case where the path definition member 51 is connected to the thermal head 31 that would reach a high temperature due to heat generation. Thus, the amount of heat transferred from the path definition member 51 to the thermal transfer ribbon 10 can be more suppressed, so that the temperature of the thermal transfer ribbon 10 at the peeling position Pe can be kept low.

In particular, for its large surface area, the support part 33 functioning as a frame has good heat dissipation and thus is unlikely to reach a high temperature. Since the path definition member 51 is connected to the support part 33, the temperature of the path definition member 51 can be kept lower, and as a result, the temperature of the thermal transfer ribbon 10 at the peeling position Pe can be kept lower.

The printing apparatus 20 may not be provided with the path definition member 51 and the peeling angle α may be defined by the position of, for example, the roller for taking up the thermal transfer ribbon 10. The direction in which the transfer target medium 19 is conveyed may be changed in the conveyance path, and this may be one of factors in defining the peeling angle α. The temperature of the thermal transfer ribbon 10 at the peeling position Pe may be kept low by providing a cooling mechanism for the path definition member 51 to lower the temperature of the path definition member 51.

[Relationship of Adhesive Force with Peeling Angle and Temperature at Time of Peeling]

Figure 5:
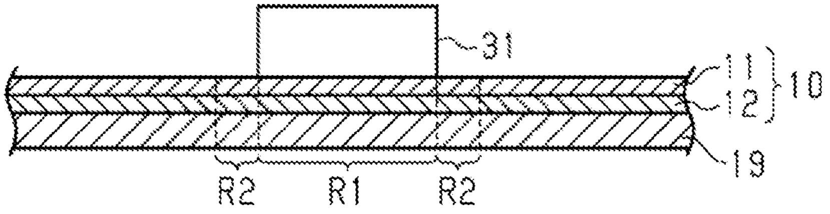
FIG. 5 is a diagram illustrating the arrangement of a transfer target region and its surrounding region.
Figure 6:
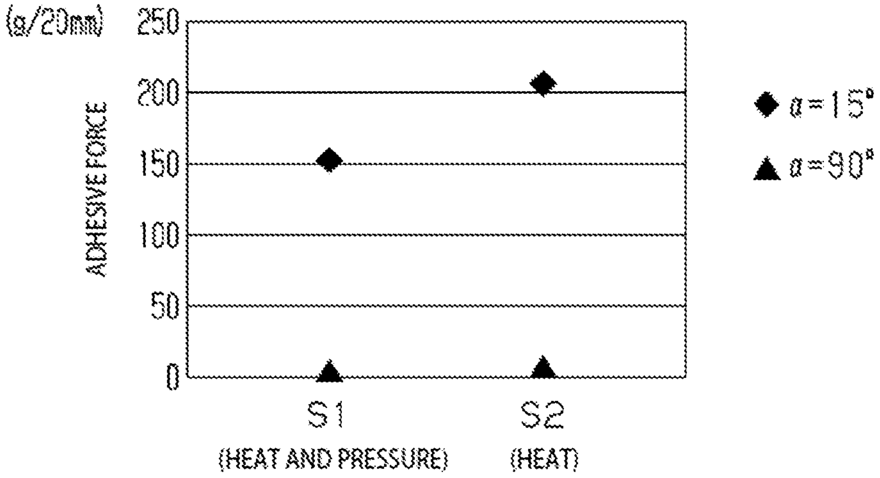
FIG. 6 is a diagram illustrating a relationship between a peeling angle and an adhesive force.
Figure 7:
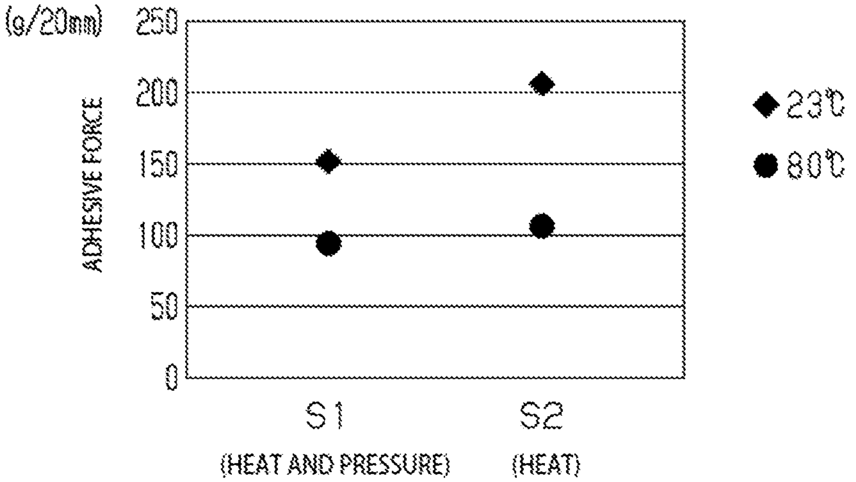
FIG. 7 is a diagram illustrating a relationship between a temperature and an adhesive force at the time of peeling.

Referring to FIGS. 5 to 7, descriptions will be given of the results of analysis of a relationship of the adhesive force F between the substrate 11 and the release layer 13 in the thermal transfer ribbon 10 with the peeling angle α and the temperature of the thermal transfer ribbon 10 at the time of peeling.

First, configurations of samples used for a test to measure the adhesive force F will be described.

As illustrated in FIG. 5, during transfer by the printing apparatus 20, a transfer target region R1 and a surrounding region R2 are generated in the thermal transfer ribbon 10. The transfer target region R1 is a region to which heat and pressure are directly applied from the resistive heating elements of the thermal head 31. The surrounding region R2 is a region to which heat is transferred from the transfer target region R1. No pressure is applied to the surrounding region R2. The surrounding region R2 is adjacent to the transfer target region R1.

For the measurement testing, a first sample S1 corresponding to the transfer target region R1 and a second sample S2 corresponding to the surrounding region R2 were produced. The first sample S1 was a sample of the thermal transfer ribbon 10 to which heat and pressure were applied. The second sample S2 was a sample of the thermal transfer ribbon 10 to which only heat was applied. The first sample S1 was produced using a transfer machine equipped with a thermal head including an array of resistive heating elements. The resistance of the array of resistive heating elements was 3000Ω. The array of resistive heating elements was supplied with electric energy at a voltage of 24 volts for a total of 3 ms, followed by pressing the sample with these resistive heating elements, thereby producing the first sample S1. The pressing force was 2.5 kgf. The second sample S2 was heated at 80° C. for five minutes.

The thickness and material of the samples S1 and S2 of the thermal transfer ribbon 10 were as follows. The samples S1 and S2 were each formed in a strip shape with a width of 20 mm.

<Thickness and Material>

Substrate Thickness: 12 μm
 Material: Polyethylene terephthalate
Release layer Thickness: 0.8 μm
 Material: Acrylic peeling agent (MCS5041 produced by DIC Corporation)
Optical functional layer Thickness: 0.8 μm
 Material: [Base resin] Acrylic polyol resin (MCA4039 produced by DIC Corporation)
 [Hardening agent] Isocyanate hardening agent (MCX102 produced by DIC Corporation)
Adhesive layer Thickness: 0.6 μm
 Material: Epoxy resin (EP1001 produced by Mitsubishi Chemical Corporation), polyester resin (Vy300 produced by Toyobo Co., Ltd.)

The test method for measuring the adhesive force F will now be described. In the measurement testing, the sample was fixed to the stage in a test machine such that the adhesive layer 15 contacted the surface of the stage, and a load was placed on the substrate 11 to pull the substrate 11 in a vertically downward direction with the angle of the stage surface to the vertically downward direction set to the target peeling angle α. The load placed on the substrate 11 was gradually increased, and the load under which the substrate 11 separated from the release layer 13 was measured as the adhesive force F. The adhesive force F was measured at different sample temperatures. The samples were heated by heating the stage.

FIG. 6 illustrates the measurement results of the adhesive forces F of the first sample S1 and second sample S2 in the case where the peeling angle α was 15° and in the case where the peeling angle α was 90°. These measurements were performed without heating the samples. That is, the temperature of the samples was an ambient temperature. The ambient temperature was 23° C.

As illustrated in FIG. 6, in both the first sample S1 and the second sample S2, the adhesive force F at the peeling angle α of 15° was significantly larger than the adhesive force F at the peeling angle α of 90°. Furthermore, there was little difference in the adhesive force F between the first sample S1 and the second sample S2 at the peeling angle α of 90°, whereas the adhesive force F of the second sample S2 was clearly larger than the adhesive force F of the first sample S1 at the peeling angle α of 15°.

The transfer layer 12 is firmly adhered to the transfer target medium 19 in the transfer target region R1. Thus, even if the thermal transfer ribbon 10 has large adhesive force F, that is, large adhesion between the transfer layer 12 and the substrate 11 in the transfer target region R1, the transfer layer 12 separates from the substrate 11 and is left on the transfer target medium 19 in that region when the thermal transfer ribbon 10 is peeled away from the transfer target medium 19. On the other hand, since the adhesion between the transfer layer 12 and the transfer target medium 19 is low in the surrounding region R2, if the adhesive force F is large in the surrounding region R2, the transfer layer 12 is removed from the transfer target medium 19 together with the substrate 11 in that region when the thermal transfer ribbon 10 is peeled away from the transfer target medium 19. Therefore, as the adhesive force F is larger, the marginal part is less likely to be formed.

Furthermore, when the adhesive force F is larger in the surrounding region R2 than in the transfer target region R1, even if the adhesion between the transfer layer 12 and the transfer target medium 19 is of the same order of magnitude between the transfer target region R1 and the surrounding region R2, the transfer layer 12 is less likely to separate from the substrate 11 in the surrounding region R2 than in the transfer target region R1. In actuality, as described above, the adhesion between the transfer layer 12 and the transfer target medium 19 is smaller in the surrounding region R2 than in the transfer target region R1, and for this reason, the transfer layer 12 is unlikely to separate from the substrate 11 in the surrounding region R2.

From the above, if the peeling angle α is 30° or less, the formation of the marginal parts is better suppressed, and if the peeling angle α is 15° or less, the formation of the marginal parts is suppressed more reliably. In conventional thermal transfer printing apparatuses, the peeling angle α is set to a large angle of about 90° to reduce energy necessary for peeling the thermal transfer ribbon away from the transfer target medium. In contrast, in the printing apparatus 20 of the present embodiment, the peeling angle α is decreased to obtain the advantageous effect of suppressing the formation of the marginal parts, which cannot be arrived at with the conventional thermal printing apparatuses.

FIG. 7 shows the measurement results of the adhesive forces F of the first sample S1 and second sample S2 when the samples were heated and not heated. The peeling angle α was 15°, the ambient temperature was 23° C., and the heating temperature of the samples was 80° C.

As shown in FIG. 7, the adhesive forces F of the first sample S1 and second sample S2 were both larger at the lower sample temperature. Furthermore, the difference in the adhesive force F between the first sample S1 and the second sample S2 was larger at the lower sample temperature. Therefore, the formation of the marginal parts can be better suppressed at lower temperatures of the thermal transfer ribbon 10 at the time of peeling.

When the peeling angle α was set to 90° and the first and second samples S1 and S2 were heated to 80° C., the adhesive forces F of these samples were both too small to measure. When comparing FIGS. 6 and 7, it can be seen that, when the peeling angle α was 30° or less, even if the temperature of the samples was high, the adhesive forces F were larger than when the peeling angle α was 90° and the samples were at the low temperature, that is, when the adhesive forces F were large at the peeling angle α of 90°. Therefore, when the peeling angle α is 30° or less, it is possible to obtain the effect of suppressing the formation of the marginal parts compared with the case where the peeling angle α is 90°, regardless of the temperature of the thermal transfer ribbon 10. Additionally, when the peeling angle α is 30° or less and the temperature of the thermal transfer ribbon 10 at the peeling position Pe is low, it is possible to further enhance the effect of suppressing the formation of the marginal parts.

The larger the amount of energy applied to the resistive heating elements of the thermal head 31, the larger the amount of heat transferred to the surroundings of the transfer target region R1. Thus, when a transferred body that is a part of the transfer layer 12, including the marginal part, is formed on the transfer target medium 19, the transferred body has a larger diameter for a larger amount of energy applied to the resistive heating elements of the thermal head 31. The analysis of change rates of the diameter of the transferred body relative to the applied energy at the peeling angles α of 15° and 90° has revealed that the change rate of the diameter of the transferred body was higher at the peeling angle α of 90°, that is, the amount of increase in the diameter of the transferred body was larger at the peeling angle α of 90° when the applied energy was increased by a predetermined amount.

The reason for this is considered to be because, since the adhesive force F was smaller at the peeling angle α of 90° than at the peeling angle α of 15°, the transfer layer 12 separated from the substrate 11 in a wider area for a smaller amount of heat at the peeling angle α of 90°.

This means that, if the environment for transfer such as the temperature of the surroundings of the thermal head 31 changes and this alters the degree of heat conduction to the surroundings of the transfer target region R1, the change in the diameter of the transferred body is smaller at the peeling angle α of 15° than at the peeling angle α of 90°. Therefore, when the peeling angle α is smaller, more stable transfer results can be obtained, irrespective of the environment for transfer. That is, setting the peeling angle α to 30° or less makes it possible to obtain the effect of reducing the burden required for setting up the environment for transfer when the printing apparatus 20 is used.

[Products]

An example of products to be manufactured by the printing apparatus 20 of the present embodiment will be described. The printing apparatus 20 is used to produce personal information media.

Figure 8:
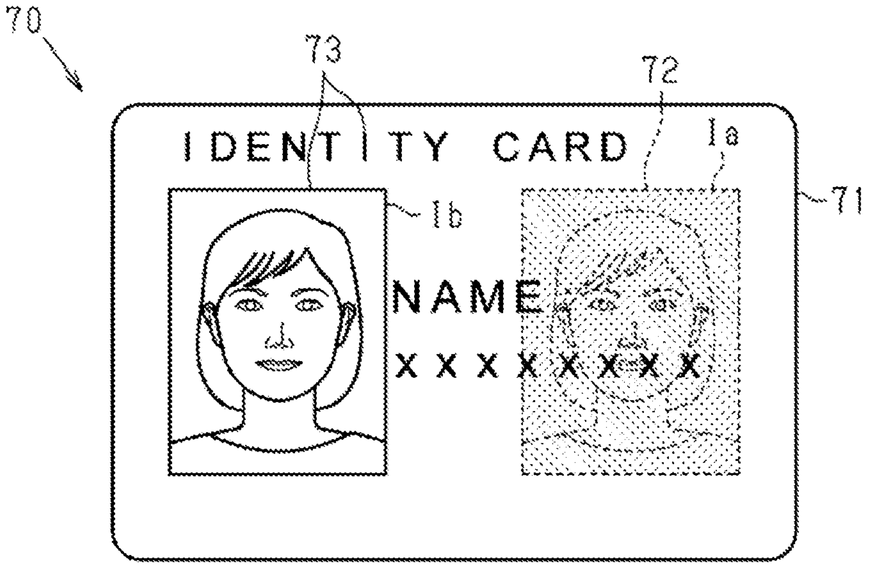
FIG. 8 is a diagram illustrating an article produced by the embodiment of the printing apparatus.

As illustrated in FIG. 8, a personal information medium 70 has a card shape. The personal information medium 70 may be embodied, for example, as an ID card for identifying the holder.

The personal information medium 70 includes a support 71, a hologram part 72, and a colored part 73. The support 71 supports the hologram part 72 and the colored part 73. The support 71 may be comprised of a plurality of layers. The support 71 may include, for example, a resin substrate.

The hologram part 72 is formed by the printing apparatus 20 transferring the transfer layer 12 from the thermal transfer ribbon 10. That is, the hologram part 72 includes a hologram that is comprised of a diffraction structure of the optical functional layer 14.

The colored part 73 exhibits color produced by one or more colorants. That is, the color visually recognized at the colored part 73 results from absorption of light by the colorant(s). The colored part 73 is formed by printing with toner or ink.

The hologram part 72 includes a part indicating first personal information Ia, and the colored part 73 includes a part indicating second personal information Ib. The first personal information Ia and the second personal information Ib are personal information on the same person, specifically, personal information on the person who will become the holder of the personal information medium 70. The personal information is information usable for identifying a person, which includes, for example, the person's name, birth date, address, facial image, and the like. In an example of the present embodiment, the first personal information Ia and the second personal information Ib each include a color facial image.

In the thermal transfer ribbon 10 used for formation of the hologram part 72 indicating a color facial image, the diffraction structure layer included in the optical functional layer 14 has a structure in which a red region, a green region, and a blue region are repeatedly arranged in a predetermined order in the direction in which the thermal transfer ribbon 10 extends. The red regions are configured to cause red diffracted light to emerge in a predetermined direction, the green regions are configured to cause green diffracted light to emerge in a predetermined direction, and the blue regions are configured to cause blue diffracted light to emerge in a predetermined direction. A portion of the transfer layer 12 including the red region, a portion of the transfer layer 12 including the green region, and a portion of the transfer layer 12 including the blue region are transferred in sequence to predetermined regions in the transfer target medium 19 so that a color image composed of an aggregate of dots is formed on the transfer target medium 19.

The printing apparatus 20 may be used to manufacture a print product different from the personal information medium 70. The printing apparatus 20 may use, as the transfer target medium 19, a substrate to be included in a final product such as the personal information medium 70 and transfer the transfer layer 12 directly to the substrate. Alternatively, the printing apparatus 20 may use, as the transfer target medium 19, a substrate different from the substrate to be included in the final product and transfer the transfer layer 12 from the thermal transfer ribbon 10 to the transfer target medium 19. In this case, the transfer layer 12 having been transferred to the transfer target medium 19 will be further transferred to the substrate to be included in the final product to form the above-mentioned product.

As described above, according to the printing apparatus 20 of the present embodiment, the following advantageous effects can be obtained.

(1) Since the peeling angle α is 30° or less, the adhesive force F of the thermal transfer ribbon 10 is large compared with the case where the peeling angle α is large. Additionally, in the thermal transfer ribbon 10, the adhesive force F is larger in the region subjected only to heat than in the region subjected to heat and pressure. Therefore, even if heat is transferred from the transfer target region R1 to the surrounding region R2, the transfer layer 12 is more suppressed from separating from the substrate 11 in the surrounding region R2. This suppresses formation of the marginal parts.

(2) If the peeling angle α is 15° or less, the adhesive force F of the thermal transfer ribbon 10 becomes still larger. Additionally, in the thermal transfer ribbon 10, the difference in the adhesive force F between the region subjected to heat and pressure and the region subjected only to heat becomes still larger. Therefore, the above configuration can more appropriately suppress formation of the marginal parts.

(3) Since the path definition member 51 is connected to a part of the head mechanism 30 other than the thermal head 31, it is possible to suppress the path definition member 51 from reaching a high temperature compared with the case where the path definition member 51 is connected to the thermal head 31. As a result, the transfer of heat from the path definition member 51 to the thermal transfer ribbon 10 can be more suppressed so that the temperature of the thermal transfer ribbon 10 can be better suppressed from reaching a high temperature at the peeling position Pe. Therefore, it is possible to suppress decrease in the adhesive force F of the thermal transfer ribbon 10, thereby more appropriately suppressing the formation of the marginal parts.

In particular, in a configuration where the path definition member 51 is connected to a part of the head mechanism 30 on the side of the movable part 32 opposite to that facing the thermal head 31, the path definition member 51 is connected to a part of the head mechanism 30 farther away from the thermal head 31, which makes it possible to reliably suppress the path definition member 51 from reaching a high temperature. Therefore, the temperature of the thermal transfer ribbon 10 at the peeling position Pe can be kept low, thereby more appropriately suppressing the formation of the marginal parts.

REFERENCE SIGNS LIST

Ma . . . Transfer medium; Mb . . . Transfer target medium; Pe . . . Peeling position; Pt . . . Transfer position; R1 . . . Transfer target region; R2 . . . Surrounding region; 10 . . . Thermal transfer ribbon; 11 . . . Substrate; 12 . . . Transfer layer; 13 . . . Release layer; 14 . . . Optical functional layer; 15 . . . Adhesive layer; 19 . . . Transfer target medium; 20 . . . Printing apparatus; 30 . . . Head mechanism; 31, 100 . . . Thermal head; 32 . . . Movable part; 33 . . . Support part; 40 . . . Platen roller; 50 . . . Ribbon conveyance unit; 51, 110 . . . Path definition member; 60 . . . Medium conveyance unit; 70 . . . Personal information medium; 71 . . . Support; 72 . . . Hologram part; 73 . . . Colored part.

What is claimed is:

1. A printing apparatus configured to transfer a transfer layer including a hologram from a thermal transfer ribbon having the transfer layer to a transfer target medium, comprising:

a head mechanism including a thermal head;

a ribbon conveyance unit that defines a conveyance path of the thermal transfer ribbon and conveys the thermal transfer ribbon along the conveyance path of the thermal transfer ribbon; and a medium conveyance unit that defines a conveyance path of the transfer target medium and conveys the transfer target medium along the conveyance path of the transfer target medium, wherein each of the conveyance path of the thermal transfer ribbon and the conveyance path of the transfer target medium includes a transfer position and a peeling position downstream of the transfer position, the transfer position being a position where the thermal transfer ribbon overlaid on the transfer target medium is subjected to heat and pressure from the thermal head, the peeling position being a position where the thermal transfer ribbon starts to be peeled away from the transfer target medium, a peeling angle formed by a direction in which the thermal transfer ribbon is conveyed from the peeling position and a direction in which the transfer target medium is conveyed from the peeling position is 2° or more and 30° or less, and the ribbon conveyance unit comprises a path definition member configured to contact the thermal transfer ribbon at a position downstream of the transfer position to define the direction in which the thermal transfer ribbon is conveyed and thereby to define the peeling angle, the path definition member is connected to a part of the head mechanism other than the thermal head, and the hologram comprises a hardening resin, which is a photosetting resin or a thermosetting resin.

2. The printing apparatus of claim 1, wherein the peeling angle formed by the direction in which the thermal transfer ribbon is conveyed from the peeling position and the direction in which the transfer target medium is conveyed from the peeling position is 2° or more and 15° or less.

3. The printing apparatus according to claim 1, wherein the head mechanism includes a movable part configured to change the position of the thermal head with respect to the conveyance path of the thermal transfer ribbon, the movable part being connected to a side of the thermal head opposite to that facing the conveyance path of the thermal transfer ribbon, and the path definition member is connected to a part of the head mechanism on a side of the movable part opposite to that facing the thermal head.

4. The printing apparatus of claim 1, wherein the path definition member is disposed downstream of the transfer position, at a position contacting the transfer medium overlaid on the transfer target medium, wherein the peeling position is formed immediately after the position where the path definition member contacts the transfer medium so that the peeling position determined by the position of the path definition member in a direction along the flow of the medium.

5. The printing apparatus of claim 1, wherein the path definition member is disposed downstream of both the transfer position and the peeling position, at a position contacting the transfer medium Ma having been peeled away from the transfer target medium so that the peeling position is formed near the transfer position, and the transfer medium is conveyed in the direction from the peeling position toward the position of the contact with the path definition member.

6. The printing apparatus of claim 1, wherein the path definition member is an oblique plate with a predetermined angle, the oblique plate contacts the transfer medium at a position downstream of the peeling position so that the transfer medium is conveyed from the peeling position along the oblique surface so that the peeling angle is defined by the angle of the oblique plate.

7. The printing apparatus of claim 6, wherein the transfer medium comprises a substrate and the transfer layer, wherein the oblique plate contacts the substrate.

8. The printing apparatus of claim 1, wherein the hologram consists of the thermosetting resin and a hardening agent.

9. The printing apparatus of claim 8, wherein the hardening agent is isocyanate.

10. The printing apparatus of claim 1, wherein the hologram consists of the photosetting resin and a UV curing agent.

11. A printing apparatus configured to transfer a transfer layer from a thermal transfer ribbon having a substrate and the transfer layer to a transfer target medium, the transfer layer including a release layer in contact with the substrate and a resin layer including a hardening resin and in contact with the release layer, comprising:

a head mechanism including a thermal head;

a ribbon conveyance unit that defines a conveyance path of the thermal transfer ribbon and conveys the thermal transfer ribbon along the conveyance path of the thermal transfer ribbon; and a medium conveyance unit that defines a conveyance path of the transfer target medium and conveys the transfer target medium along the conveyance path of the transfer target medium, wherein each of the conveyance path of the thermal transfer ribbon and the conveyance path of the transfer target medium includes a transfer position and a peeling position downstream of the transfer position, the transfer position being a position where the thermal transfer ribbon overlaid on the transfer target medium is subjected to heat and pressure from the thermal head, the peeling position being a position where the thermal transfer ribbon starts to be peeled away from the transfer target medium, a peeling angle formed by a direction in which the thermal transfer ribbon is conveyed from the peeling position and a direction in which the transfer target medium is conveyed from the peeling position is 2° or more and 30° or less, and the ribbon conveyance unit comprises a path definition member configured to contact the thermal transfer ribbon at a position downstream of the transfer position to define the direction in which the thermal transfer ribbon is conveyed and thereby to define the peeling angle, the path definition member is connected to a part of the head mechanism other than the thermal head, wherein the hardening resin is a photosetting resin or a thermosetting resin.

12. The printing apparatus of claim 11, wherein the peeling angle formed by the direction in which the thermal transfer ribbon is conveyed from the peeling position and the direction in which the transfer target medium is conveyed from the peeling position is 2° or more and 15° or less.

13. The printing apparatus according to claim 11, wherein the head mechanism includes a movable part configured to change the position of the thermal head with respect to the conveyance path of the thermal transfer ribbon, the movable part being connected to a side of the thermal head opposite to that facing the conveyance path of the thermal transfer ribbon, and the path definition member is connected to a part of the head mechanism on a side of the movable part opposite to that facing the thermal head.

14. The printing apparatus of claim 11, wherein the path definition member is disposed downstream of the transfer position, at a position contacting the transfer medium overlaid on the transfer target medium, wherein the peeling position is formed immediately after the position where the path definition member contacts the transfer medium so that the peeling position determined by the position of the path definition member in a direction along the flow of the medium.

15. The printing apparatus of claim 11, wherein the path definition member is disposed downstream of both the transfer position and the peeling position, at a position contacting the transfer medium Ma having been peeled away from the transfer target medium so that the peeling position is formed near the transfer position, and the transfer medium is conveyed in the direction from the peeling position toward the position of the contact with the path definition member.

16. The printing apparatus of claim 11, wherein the path definition member is an oblique plate with a predetermined angle, the oblique plate contacts the transfer medium at a position downstream of the peeling position so that the transfer medium is conveyed from the peeling position along the oblique surface so that the peeling angle is defined by the angle of the oblique plate.

17. The printing apparatus of claim 11, wherein the resin layer consists of the thermosetting resin and a hardening agent.

18. The printing apparatus of claim 17, wherein the hardening agent is isocyanate.

19. The printing apparatus of claim 11, wherein the resin layer consists of the photosetting resin and a UV curing agent.

* * * * *